March 3, 1959  C. P. MANN  2,875,994
FURNACE FOR HEATING SHEETS OF MATERIAL
Filed Dec. 1, 1954
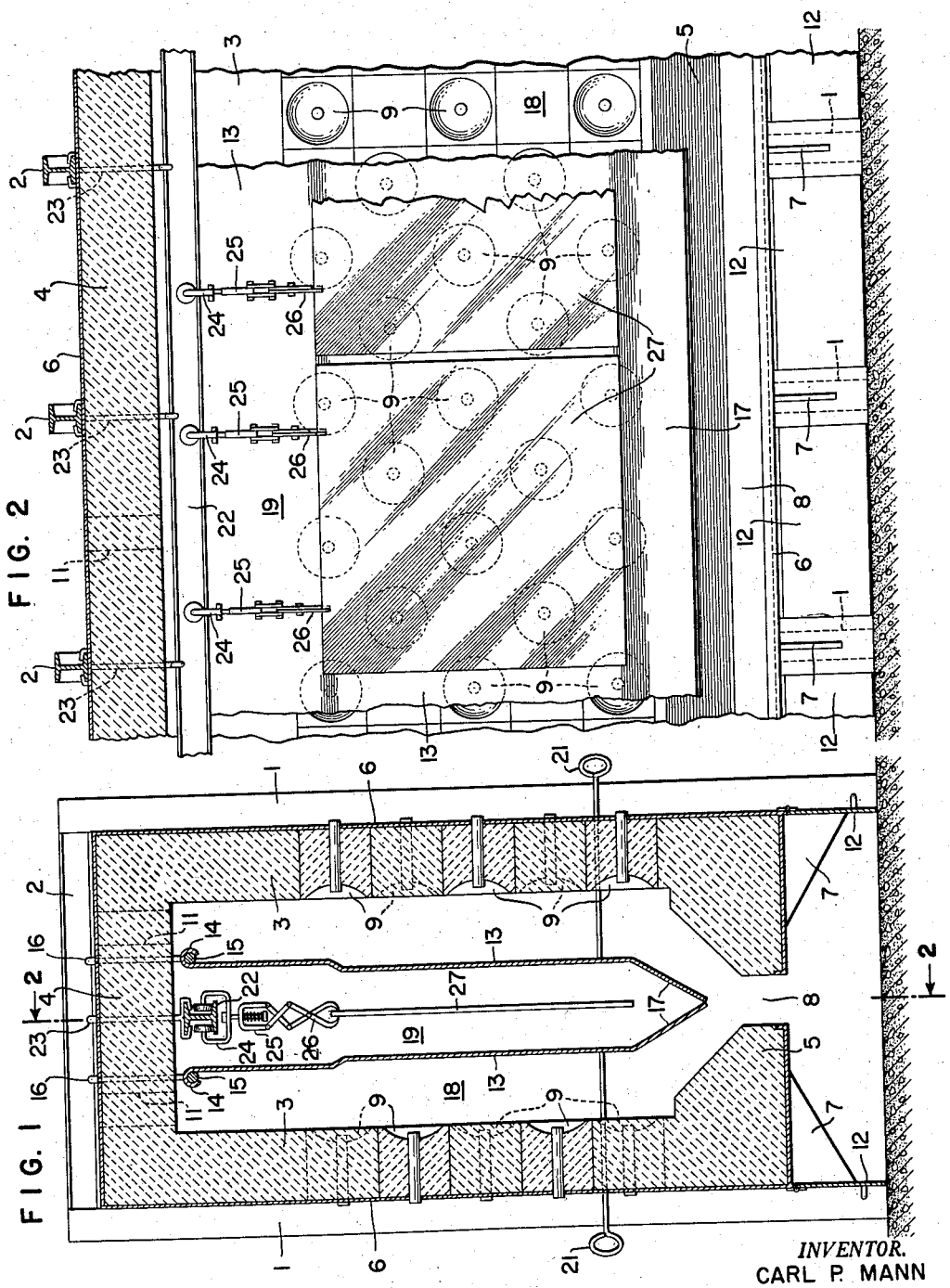
INVENTOR.
CARL P. MANN
BY *E. Willford Mason*
ATTORNEY.

United States Patent Office 2,875,994
Patented Mar. 3, 1959

2,875,994

FURNACE FOR HEATING SHEETS OF MATERIAL

Carl P. Mann, Riverton, N. J., assignor to Selas Corporation of America, Philadelphia, Pa., a corporation of Pennsylvania Application December 1, 1954, Serial No. 472,359

4 Claims. (Cl. 263—6)

The present invention relates to furnaces, and more particularly to a furnace or oven in which sheets of glass or similar material are heated to a temperature at which they are annealed or may be tempered.

It has been difficult to heat large sheets of glass uniformly to an annealing temperature because of the low thermal conductivity of the glass. This has led to localized hot and cold spots that have affected the quality of the finished product.

It is an object of the invention to provide a furnace structure in which sheets of glass of varying sizes can be uniformly heated. It is a further object of the invention to provide a furnace in which the heating chamber is substantially without drafts and localized heating currents.

It is a further and more specific object of the invention to provide a structure in which the glass sheets to be heated are moved between a pair of plates of a material having high thermal conductivity and forming a heating space. These plates are heated by a plurality of relatively small burners, and in turn, transfer heat by radiation to the glass sheet. Thus, the glass sheets are heated by radiation while they are substantially out of contact with products of combustion.

The various features of novelty which characterize my invention are pointed out with particularly in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a transverse section of the furnace of the present invention; and

Figure 2 is a view taken on line 2—2 of Figure 1.

Referring to the drawings, there is shown an elongated, narrow furnace which has a structural steel framework including buckstays 1 and horizontal beams 2. The furnace itself is made of a refractory structure in accordance with ordinary furnace practice and includes the side walls 3 and roof 4. The floor sections of the furnace shown at 5 extend inwardly from the sides. The entire refractory structure is backed up by the sheet metal 6. As shown herein, the floor sections are supported by gussets 7, and are so designed that there is a longitudinal slot 8 formed between the sides thereof. The furnace is heated by means of a plurality of burners 9 which are located at spaced points along the walls of the furnace chamber. These burners may be of any desired type, but are preferably of the radiant cup type disclosed in Hess Patent 2,215,079, issued September 20, 1940. Burners of this type operate to heat the cups of the burners and the adjacent walls of the furnace to incandescence, so that radiant heat is directed into the furnace enclosure. Some heat is also obtained by convection from the hot products of combustion which may be exhausted through suitable vent openings 11 provided at spaced points along the roof. Infiltration of the air through the bottom of the furnace in the slot 8 is prevented by means of sheet metal doors 12 that are located along the sides of the furnace below the floor.

The actual heating of the work is done by a pair of sheet metal plates 13 of some composition that will withstand the temperatures of the furnace and has a high heat conductivity. These plates may be single pieces of metal the length of the furnace, but for ease of handling, preferably are formed of a plurality of sections which are spaced closely adjacent to each other. The plates are supported adjacent to the roof of the furnace by means of hook shaped portions 14 formed along the upper edge thereof. These portions engage rods 15 extending lengthwise of the furnace with the rods in turn being held by suitable hangers 16 that are supported from the cross beams 2. It will be noted that the lower edges of these plates are bent toward each other as shown at 17, so that they are normally in substantial engagement with each other. As best shown in Figure 1 of the drawing, the space within the furnace chamber is divided into a pair of firing or combustion spaces 18 between the walls of the furnace and the plates 13, and into a heating space 19 formed between the plates. It is noted that the plates may be swung around the rods 15 in order to separate their lower edges for purposes which will be described below. To this end, each of the plates has suitably attached thereto a rod 21 which extends through the side walls of the furnace and by means of which the shields can be pivoted around the rod 15.

The glass sheets 27 that are to be annealed or tempered are moved through the heating space of the furnace on suitable conveying apparatus. This is shown herein as consisting of a rail 22 extending lengthwise of the furnace chamber midway between the plates 13. The rail is supported at spaced points along the length thereof by means of hangers 23 extending through the roof 4 and attached to the cross beams 2. A plurality of carriages 24 ride along the lower flange of the rail. The carriages carry suspended therefrom yokes 25 to which are attached tongs 26. A plurality of these tongs engage the upper edge of each glass sheet 27 to hold it suspended in the heating space 19 as the carriages 24 are moved along the rail.

In the operation of the apparatus, the burners 9 are fired to heat the furnace chamber. These burners will heat the plates 13 to a suitable temperature by radiant and convected heat. The plates, because of their ability to conduct heat, will become heated evenly throughout their area even though the burners are located at spaced points along the walls of the furnace. The plates in turn transmit heat by radiation evenly to both sides of the glass sheets that are suspended in the heating space between them.

The time required to heat the glass sheets will depend, of course, upon their thickness and the temperature to which they are to be heated. This time can be varied for a furnace of a given temperature and length by varying the speed at which the glass sheets can be moved along the conveyor. Ordinarily, for annealing or tempering, glass will be heated to the vicinity of 1000° F. This will necessitate a temperature in the heating space of 1250° F. It is extremely difficult to obtain a measurement of the temperature of a glass sheet in any furnace. With the present arrangement, however, this is unnecessary, since there is a definite relation between the temperature of the plates 13 and the glass sheet. The temperature of the plates can be measured by ordinary thermocouples and the burners adjusted to keep the plate temperature and consequently the glass temperature at a desired value.

With the arrangement described above, the even temperature to which the plates 13 are heated insures that an even temperature will be radiated to the glass sheet 27 thereby heating this sheet evenly throughout its entire area. One of the disadvantages of most furnaces previously used for this purpose has been the inability to obtain exactly even heating over the entire surface of the glass. This resulted in localized hot and cold spots causing the production of an inferior product. In addition, movement of the furnace gases around the glass sheets frequently had a harmful effect on them. The furnace of the present invention overcomes each of these defects, in that the even temperature of the plates 13 is transmitted uniformly to the surface of both sides of the glass, so that there can be no localized hot or cold spots. In addition, the shape and location of the plates is such that there is substantially no movement of the furnace gases that come into direct contact with the heated surface of the glass sheets, and no draft of cold air can sweep across the sheets.

From time to time, it may be that a sheet of glass will slip from the tongs 26 and be broken. When this happens, it is only necessary for an attendant to move the handles 21 outwardly in order to open the lower portion of the heating space, and let the broken glass fall through the slot 8 in the furnace floor. Glass can be removed from beneath the furnace at a convenient time through the doors or flaps 12.

From the above, it will be seen that I have provided a furnace for heating or annealing sheets of glass or similar material in which the glass is heated evenly throughout its entire area from both sides and in which the glass is protected from drafts and is separated from the products of combustion during the time that heating takes place.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. In a furnace for heating glass sheets, the combination of structure forming an elongated, narrow furnace chamber having oppositely disposed side walls and a roof, a plurality of burners located at spaced points in said side walls, a pair of plates of heat conducting material suspended from said roof and parallel to said side walls and each other, the portion of the chamber between said plates forming a heating space, means to suspend a sheet of glass to be heated in said heating space with the glass substantially equidistant from each of said plates, means to move said suspending means lengthwise of said furnace chamber, said plates being shaped substantially to engage each other at a point below the glass sheet, means to separate the lower portions of said plates, and means forming a slot in said furnace chamber below said plates.

2. In a furnace for heating sheet material, the combination of a pair of elongated plates of heat conducting material, means to suspend said plates in parallel relation and spaced apart to form a relatively narrow and elongated heating space between them, the lower portion of said plates being shaped substantially to engage each other, means to support a sheet of material to be heated in said space and parallel to said plates, means to mount said supporting means for movement lengthwise of said plates, and means including a plurality of burners located at spaced points beyond each of said plates to heat the same, heat being transferred by said plates to heat said space and the sheet located in the same.

3. The combination of claim 2 including means to move the lower portions of said plates apart to permit material accumulated in said space to drop from the same.

4. In a furnace for heating sheets of material, structure forming an elongated furnace chamber having opposed side walls and a roof, a pair of plates of heat conducting material, means to suspend said plates from said roof substantially parallel to each other and to said side walls to divide said chamber into a heating space between said plates and firing spaces between each of said plates and said side walls, said plates being shaped to close the lower portion of said heating space, a plurality of burners located at spaced points in each side wall and directed toward the plate adjacent thereto, means to suspend a sheet of material to be heated from said roof in said heating space, means to move the lower portions of said plates apart, said structure being provided with a floor having an elongated slot therein beneath said heating space, and means to prevent infiltration of air into said chamber through said slot.

References Cited in the file of this patent

UNITED STATES PATENTS

| | | |
|---|---|---|
| 1,549,191 | Fisher | Aug. 11, 1925 |
| 2,197,550 | Hinsey | Apr. 16, 1940 |